United States Patent
Lvovsky et al.

(10) Patent No.: US 10,083,065 B2
(45) Date of Patent: Sep. 25, 2018

(54) CREATING MULTIPLE RULES FOR A DEVICE TO ALLOW CONCURRENT ACCESS TO THE DEVICE BY DIFFERENT VIRTUAL MACHINES

(71) Applicant: Red Hat Israel, Ltd., Raanana (IL)

(72) Inventors: Igor Lvovsky, Raanana (IL); Eduardo Warszawski, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 315 days.

(21) Appl. No.: 13/725,431

(22) Filed: Dec. 21, 2012

(65) Prior Publication Data
US 2014/0181809 A1    Jun. 26, 2014

(51) Int. Cl.
*G06F 9/50*      (2006.01)
*G06F 9/46*      (2006.01)
*G06F 9/455*     (2018.01)

(52) U.S. Cl.
CPC ........ *G06F 9/5005* (2013.01); *G06F 9/45558* (2013.01); *G06F 9/468* (2013.01); *G06F 9/50* (2013.01); *G06F 2009/45562* (2013.01); *G06F 2009/45587* (2013.01); *G06F 2009/45595* (2013.01)

(58) Field of Classification Search
CPC .......... G06F 9/468; G06F 9/50; G06F 9/5005; G06F 9/45558; G06F 2009/45587; G06F 2009/45562; G06F 21/57
USPC .......................................................... 718/1
See application file for complete search history.

(56) References Cited

U.S. PATENT DOCUMENTS

| | | | |
|---|---|---|---|
| 7,689,676 B2 * | 3/2010 | Vinberg | G06F 8/61 703/20 |
| 8,583,920 B1 * | 11/2013 | Bursell | G06F 21/44 713/164 |
| 8,683,560 B1 * | 3/2014 | Brooker | G06F 21/44 713/155 |
| 2010/0153945 A1 * | 6/2010 | Bansal et al. | 718/1 |
| 2011/0231840 A1 * | 9/2011 | Burch et al. | 718/1 |
| 2012/0060171 A1 * | 3/2012 | Bobroff | G06F 9/505 718/105 |
| 2012/0311565 A1 * | 12/2012 | Natapov et al. | 718/1 |
| 2013/0014106 A1 * | 1/2013 | Imai et al. | 718/1 |
| 2013/0074066 A1 * | 3/2013 | Sanzgiri | H04L 49/70 718/1 |
| 2013/0219297 A1 * | 8/2013 | Soundararajan et al. | 715/752 |
| 2013/0262405 A1 * | 10/2013 | Kadatch | G06F 9/5072 707/692 |
| 2014/0115578 A1 * | 4/2014 | Cooper et al. | 718/1 |

* cited by examiner

*Primary Examiner* — Jacob D Dascomb
(74) *Attorney, Agent, or Firm* — Lowenstein Sandler LLP

(57) ABSTRACT

An exemplary system may allow concurrent access to a device by different virtual machines. In one embodiment, the system receives a request to add a virtual machine (VM) of a plurality of virtual machines to a host, the request identifying a device that is shared by the plurality of virtual machines. The system creates a VM-specific rule for the device based on the VM. The system stores the VM-specific rule for the device in association with the VM.

20 Claims, 5 Drawing Sheets

CREATING MULTIPLE RULES FOR A DEVICE TO ALLOW CONCURRENT ACCESS TO THE DEVICE BY DIFFERENT VIRTUAL MACHINES

TECHNICAL FIELD

Embodiments of the present disclosure relate to accessing a device of a computing system, and more particularly, to a technique for creating multiple rules for a device to allow concurrent access to the device by different virtual machines.

BACKGROUND

Most modern computing systems allow a hardware device, such as a disk, a network card, etc., to be associated with the computing system. When a device is added to the computing system, the computing system can determine whether a general rule or rules exist on the computing system for that type of hardware device. The general rule can include information about one or more actions for the computing system to perform when a hardware device of the corresponding type is added. If a general rule for the type of hardware device exists on the computing system, the hardware device can be successfully added to the system and the general rule for the type of hardware device can be applied to the hardware device.

Once the hardware device has been added, a first virtual machine running on the computing system can have access to or use the hardware device. The first virtual machine can use the general rule for the type of hardware device, and may prevent another virtual machine from using the general rule and/or the hardware device. If a second virtual machine running on the computing system needs access to the hardware device, the second virtual machine may be required to wait for the first virtual machine to finish its access to the hardware device, and may have to wait until the first virtual machine is done with the general rule to use it.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the disclosure are directed to a method and system for creating multiple rules for a device to allow concurrent access to the device by different virtual machines.

When a virtual machine is created on or added to a computing system, one or more hardware devices may need to be updated or used by the virtual machine. A request to create or add a virtual machine can therefore identify a device to be used by the virtual machine. For example, a virtual machine can be created on a computing system and can require exclusive or semi-exclusive access to a disk. The device can be a virtual device or a physical device, and can be shared by the virtual machine and at least one other virtual machine. A device rule can be created for the device based on the virtual machine, such that the virtual machine has its own virtual machine-specific device rule. The virtual machine-specific device rule is owned by the virtual machine and can be stored for the device in association with the virtual machine. When another virtual machine is created on or added to the computing system, the request to add for the other virtual machine may identify the same hardware device as the request to add or create the first virtual machine. Another device rule can be created that is specific to the other virtual machine for the device, such that the other virtual machine has its own virtual machine-specific device rule. Once both virtual machines have been added or created, each virtual machine will have its own virtual machine-specific device rule for the device and can apply its virtual machine-specific device rule to the hardware device. Therefore, the hardware device can be concurrently accessed by multiple virtual machines because each virtual machine has its own virtual machine-specific rule. The virtual machine-specific device rule associated with a virtual machine may prevent access to the device if the virtual machine-specific device rule restricts permissions of the device.

When a virtual machine is removed from the computing system, the virtual machine-specific device rule associated with that virtual machine is removed. If there is another virtual machine-specific device rule associated with another virtual machine for the hardware device, the virtual machine-specific device rule associated with the other virtual machine may be stored and applied to the device. If there are no virtual machine-specific device rules remaining for the device (e.g., device rules associated with other virtual machines), a predetermined action may be performed on the device. For example, if a virtual machine A was removed from the computing system and the virtual machine A had a rule "virtual machine A disk X rule," the rule would be removed. If no other rules that included disk X exist, a predetermined action is performed on disk X, such as changing the permission of disk X to superuser.

Figure 1:
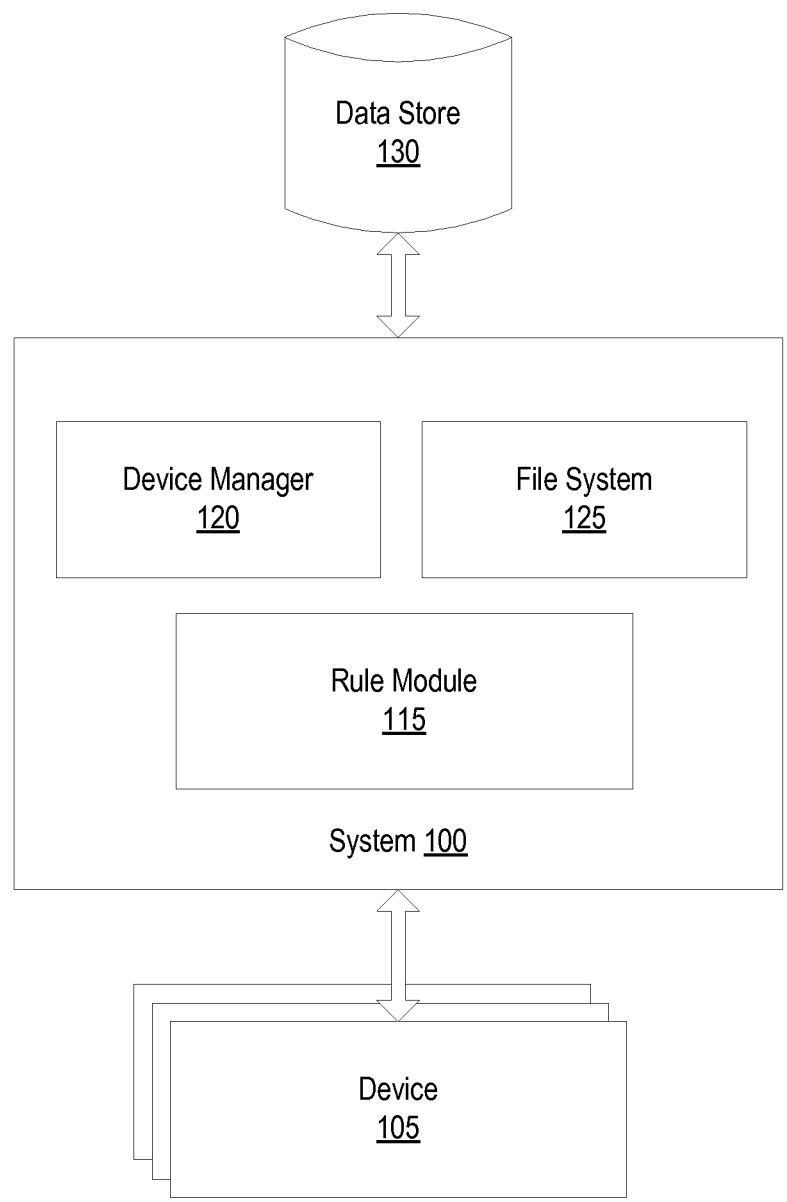
FIG. 1 illustrates exemplary system architecture, in accordance with various embodiments of the present disclosure.

FIG. 1 illustrates an exemplary system 100 in which embodiments can be implemented. System 100 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

Device 105 can include one or more devices that can be associated with a system. The device 105 can be any device that can be connected to a system and that can be used by the system 100. The device 105 can be a physical hardware device, such as a physical disk, a physical network controller, a physical network card, etc. In some embodiments, system 100 is a virtual machine host that includes a hypervisor and one or more virtual machines running on top of the hypervisor, where each virtual machine may include a guest operating system and one or more guest applications. In such embodiments, the device 105 can be a physical hardware device or a virtual device, such as a virtual disk, a virtual network controller, a virtual network card, etc. Each virtual machine can have one or more virtual devices.

Data store 130 can include one or more writable persistent storage devices, such as memories, tapes or disks. In one embodiment, the one or more writable persistent storage devices included in data store 130 are non-Random Access Memory (RAM) devices. Although each of system 100 and data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the memory 130 can include data related to the system 100. Examples of data related to the system 100 can include, and are not limited to, a state of the system 100, rules to apply to devices (e.g., devices 105) connected to the system 100, and any other electronically stored information that can be associated with a system, etc.

During operation of the system 100, the system 100 can receive a request to add a virtual machine to the system 100. The request can identify a device to be used by the virtual machine. The device to be used by the virtual machine can be shared by more than one virtual machines running on the system 100. In one embodiment, the system 100 can include a rule module 115, a device manager 120, and a file system 125. The rule module 115 and/or the device manager 120 may be part of the host operating system or the hypervisor, or may run on top of the host operating system or the hypervisor.

The device manager 120 can be a device manager for the system 100 that can provide information about devices, such as devices 105, which are currently on the system 100. Moreover, the device manager 120 can perform one or more actions when a virtual machine is added to or created on the system 100 or when devices are added or removed from the system 100. The actions performed by the device manager 120 can be based on one or more rules stored in data store 130. The rules can be generated by the rule module 115.

In one embodiment, the rule module 115 creates a rule for a device 105 upon receiving a request to add a virtual machine from the device manager 120. In an alternate embodiment, the rule module 115 can access the virtual machines running on the system 100 through the host operating system or the hypervisor, and therefore can obtain a request to add a virtual machine directly. In one embodiment, the request to add a virtual machine is generated in response to the addition or creation of a virtual machine on the system 100. In an alternate embodiment, the request to add a virtual machine is generated in response to the addition of virtual device to the system 100. In another alternate embodiment, the request to add a virtual machine is generated in response to a user input of a future addition of virtual machine to the system 100. The request to add a virtual machine can include an identification of a virtual machine to create or add and an identification of the device 105 that the virtual machine will access or use. In one embodiment, the device 105 that the virtual machine will access or use is a device that is shared by multiple virtual machines on the system 100. Examples of a device that is shared by multiple virtual machines are sound cards, disks, etc. In one embodiment, the identification of the device 105 that the virtual machine will access or use is a type of the device (e.g., sound card, disk, etc.) In some embodiments, the request to add a virtual machine can also include a unique identifier of the device 105 that the virtual machine will access or use, a size of the device 105 that the virtual machine will access or use, a manufacturer of the device 105 that the virtual machine will access or use, etc.

In response to the request to add a virtual machine, the rule module 115 can create a virtual machine-specific rule for the device 105 based on the virtual machine that will access or use the device 105. The virtual machine-specific rule for the device 105 can be based on (e.g., identical to) an existing rule for the device 105, and can be associated with the virtual machine identified in the request to add a virtual machine. For example, a request to add a virtual machine 1 identifies that virtual machine 1 will use a disk, and the disk has an existing rule X. In this example, a virtual machine-specific rule for the disk will be created based on virtual machine 1 and existing rule X, such as "virtual machine 1 X."

The rule module 115 can determine whether the request to add a virtual machine identifies any additional device 105 and can create a virtual machine-specific rule for the additional device 105 based on the virtual machine. The rule module 115 can create a virtual machine-specific rule for each device 105 identified in the request to add a virtual machine.

The rule module 115 can write the virtual machine-specific rule for the device based on the virtual machine to data store 130 using the file system 125. The file system 125 can access the data store 130. The file system 125 can access an existing rule for the device on which the virtual machine-specific rule was based and can open a file for the rule module 115 to write the virtual machine-specific rule to. The file system 125 can save the file for the virtual machine-specific rule to data store 130 once the rule module 115 has written to the file.

In one embodiment, the rule module 115 can store the virtual machine-specific rule for the device 105 to data store 130. In some embodiments, the rule module 115 can further provide the virtual machine-specific rule to the device manager 120.

In one embodiment, the device manager 120 applies the virtual machine-specific rule upon receiving the virtual machine-specific rule from the rule module 115. In an alternate embodiment, the device manager 120 accesses data store 130 to obtain and apply the virtual machine-specific rule once the virtual machine is created on or added to the system 100. In another alternate embodiment, the device manager 120 accesses data store 130 to obtain and apply the virtual machine-specific rule when the virtual machine accesses (e.g., performs an operation on) the device to which the virtual machine-specific rule applies. For example, if virtual machine 1 has a specific rule for a disk, then the device manager 120 can apply the rule for the disk when virtual machine 1 accesses the disk. The device manager 120 can apply the virtual machine-specific rule by determining whether or not to allow an operation that accesses the device 105 by the virtual machine based on the virtual machine-specific rule. For example, if a virtual machine performs a write operation to a disk, and the virtual machine rule for the disk gives the virtual machine read-only permission to the disk, the device manager 120 will determine that the write operation should not be allowed for the virtual machine based on the rule for the virtual machine. In some embodiments, the device manager 120 performs any actions specified in the virtual machine-specific rule using the device 105 for which the virtual machine-specific rule was generated and any other device 105 included in the virtual machine-specific rule. Examples of the actions performed by the device manager 120 include changing the permission of the device 105, changing the configuration of the device 105, etc.

The rule module 115 can further receive a removal request for a virtual machine. Upon receiving a removal request for a virtual machine, the rule module 115 can remove any virtual machine-specific rules associated with the virtual machine in the removal request. The removed rules can identify a device 105. The rule module 115 can determine whether any additional virtual machine-specific rules exist for the identified device 105 (e.g., virtual machine-specific rules for other virtual machines running on the system 100). In one embodiment, if the rule module 115 determines that an additional virtual machine-specific rule exists for the identified device 105, the rule module 115 can apply the additional virtual machine-specific rule. In one embodiment, if the rule module 115 determines that no additional virtual machine-specific rules exist for the identified device 105, the rule module 115 can perform a predetermined action on the device. In an alternate embodiment, if the rule module 115 determines that no additional virtual machine-specific rules exist for the identified device 105, the rule module 115 can cause the device manager 120 to perform a predetermined action on the identified device 105.

Figure 2:
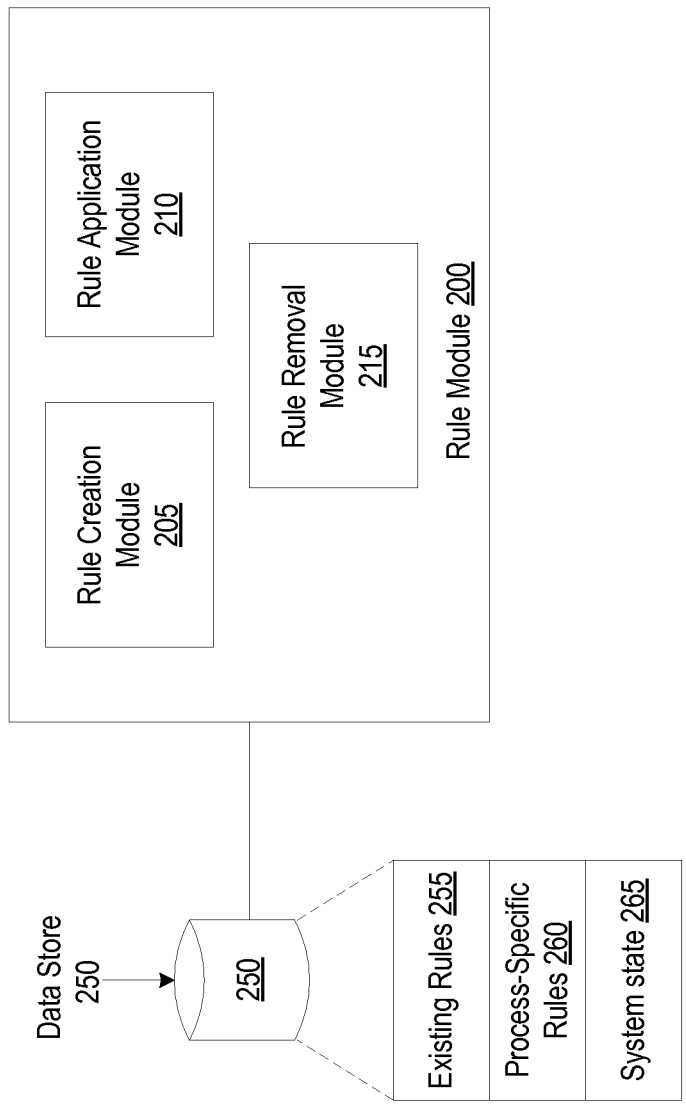
FIG. 2 is a block diagram of a rule manipulation module, in accordance with an embodiment.

FIG. 2 is a block diagram of a rule module 200, in accordance with one embodiment of the present disclosure. The rule module 200 includes a rule creation module 205, a rule application module 210, and a rule removal module 215. Note that in alternative embodiments, the functionality of one or more of the rule creation module 205, the rule application module 210, and the rule removal module 215 may be combined or divided.

The rule creation module 205 can create a virtual machine-specific rule for a device upon receiving a request to create or add a virtual machine to a host. The request can include an identification of a virtual machine to create or add and an identification of the device that the virtual machine will access or use. The device that the virtual machine will access or used can be a device that can be shared by multiple virtual machines, such as a disk, a sound card, etc. In some embodiments, the request can also include a unique identifier of the device that the virtual machine will access or use, a size of the device that the virtual machine will access or use, a manufacturer of the device that the virtual machine will access or use, etc. The rule creation module 205 can create the virtual machine-specific rule for the device by obtaining an existing rule for the device, generating a virtual machine-specific rule for the device based on the existing rule, and associating the virtual machine-specific rule with the virtual machine. The rule creation module 205 can obtain an existing rule for the device by accessing a data store, such as existing rules 255 of data store 250.

Upon creating the virtual machine-specific rule, the rule creation module 205 can send the virtual machine-specific rule to the rule application module 210. The rule creation module 205 can determine whether the creation request identifies any additional devices to be used and/or accessed by the virtual machine, and can create a virtual machine-specific rule for any additional devices included in the creation request for the virtual machine.

The rule application module 210 can store the virtual machine-specific rule in a data store, such as virtual machine-specific rules 260 of data store 250. The rule application module 210 can cause the virtual machine-specific rule for the device to be applied based on the system state by a device manager (not shown). The system state can include the devices currently associated with the computing system and system requirements for the devices. The rule application module 210 can cause the virtual machine-specific rule for the device to be applied based on the system state by determining rules (e.g., virtual machine-specific rule and existing rule) for the devices included in the system state and providing the determined rules to a device manager to be applied by the device manager. In one embodiment, the rule application module 210 provides the virtual machine-specific rules associated with a device to the device manager upon the creation of a new virtual machine-specific rule. For example, if a creation request for virtual machine A causes a virtual machine-specific rule for virtual machine A to be created for disk X, and virtual machine-specific rule for virtual machine B exists for disk X and a virtual machine-specific rule for virtual machine C exists for disk X, the rule application module 210 will provide the virtual machine-specific rules for virtual machine A, B, and C for disk X to the device manager to be applied.

The rule removal module 215 can remove one or more virtual machine-specific rules upon receiving a request to remove a virtual machine. The rule removal module 215 can determine the virtual machine-specific rules associated with the virtual machine to be removed and delete the virtual machine-specific rules associated with the virtual machine to be removed. The rule removal module 215 can further identify one or more devices that the deleted virtual machine-specific rules were associated with. The rule removal module 215 can determine if any additional virtual machine-specific rules exist for each device that the deleted rules are associated with. If no additional rules exist for the device that the deleted rules are associated with, the rule removal module 215 can perform a predetermined action on the device. If additional rules exist for the device that the deleted rules are associated with, the rule removal module 215 may not perform any action on the device.

Figure 3:
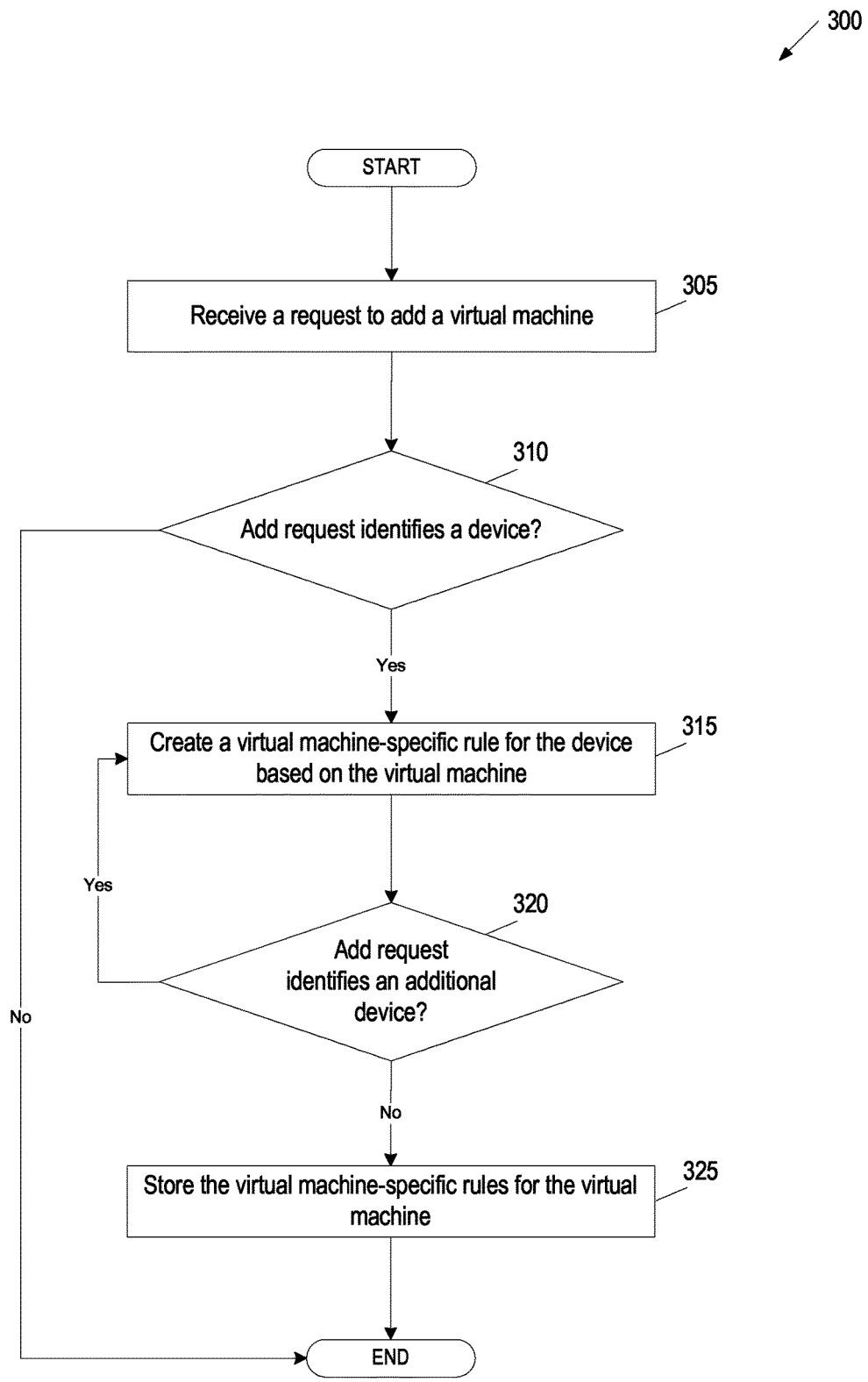
FIG. 3 is a flow diagram illustrating an embodiment for a method of creating multiple rules for a device to allow concurrent access to the device by different virtual machines, in accordance with an embodiment.

FIG. 3 is a flow diagram of an embodiment of a method 300 for creating multiple rules for a device to allow concurrent access to the device by different virtual machines. The method 300 is performed by processing logic that may comprise hardware (circuitry, dedicated logic, etc.), software (such as is run on a general purpose computer system or a dedicated machine), or a combination of both. In one embodiment, the method 300 is performed by the rule module 200 of FIG. 2.

At block 305, processing logic receives a request to add a virtual machine. In one embodiment, the request to add a virtual machine is received in response to a request to create or add a virtual machine to a computing system using software, such as the creation of or addition of a virtual machine on a computing system. In an alternate embodiment, the request to add a virtual machine is received in response to an addition of physical hardware or software to a computing system, such as the addition of a disk of the computing system, the insertion of a Universal Serial Bus (USB) connector into the computing system to form a connection between the computing system and a hardware device, etc. The request to add a virtual machine can include an identifier for the virtual machine or a device, such as a name of a virtual machine to create or add, a name of virtual hardware to create or add, a serial number of a physical disk, etc. The request to add a virtual machine can further include one or more requirements for the virtual machine, such as one or more requirements for creating or adding the virtual machine, the physical hardware, etc. The requirements for the virtual machine can identify a device to use for the requirement. For example, the requirements can identify a specific disk or type of disk for a virtual machine to use (e.g., disk A belongs to virtual machine 1), the requirements can identify that the virtual machine will require a network card, etc. In one embodiment, the device to use for the requirement for the virtual machine is a device that can be shared by multiple virtual machines on a computing system, such as a disk, a sound card, a network card, etc.

At block 310, processing logic determines whether the request identifies a device. Processing logic can determine whether the request identifies a device by accessing the request and searching the request for a keyword, such as a type of a device (e.g., disk), a serial number of a device, etc. In one embodiment, if the request does not identify a device, then a virtual machine-specific rule for the device does not need to be created, and the method 300 ends. In an alternate embodiment, if the request does not identify a device, a default set of rules is generated for the device, and the method 300 proceeds to block 315. If the request does identify a device, the method 300 proceeds to block 315.

At block 315, processing logic creates a virtual machine-specific rule for a device based on the virtual machine. In one embodiment, processing logic creates the rule for the device based on the virtual machine by determining an existing device rule for the device, generating a virtual machine-specific rule based on the existing device rule, and associating the virtual machine-specific rule with the virtual machine. In one embodiment, processing logic determines an existing device rule for the device by accessing a data store and obtaining one or more rules associated with the device that meet the requirement that identified the device. For example, if the requirement in the request identifies virtual machine 1 and requires virtual machine 1 to use a disk, then an existing device rule for a disk (e.g., a permission rule for a disk) is obtained. In some embodiments, if more than one existing device rule is associated with the identified device, all the existing device rules for the identified device can be obtained.

In one embodiment, processing logic generates a virtual machine-specific rule based on the existing device rule by cloning the existing device rule, thereby creating a clone of the existing device rule. In another embodiment, processing logic generates the virtual machine-specific rule by creating a new rule that is specific to the virtual machine. The virtual machine-specific device rules for the device can be written orthogonally or algebraically, such that the virtual machine-specific rules may not interfere with each other or affect the permissions or access of other virtual machines in the case of more than one virtual machine having a virtual machine-specific rule for a device. The virtual machine-specific rules for a device can be summed or subtracted without affecting the other rules (either existing or virtual machine-specific rules) for the device, the hardware of the computing system, or the software of the computing system.

For example, if a reader rule for a device includes 1) Chgrp kvm LUN and 2) Chmod g+r LUN and a writer rule for a device includes 1) Chown vdsm LUN and 2) Chmod u+rw LUN, the reader rule and the writer rule are written in such a way as the application of the reader rule will not interfere with the application of the writer rule, and vice versa. In another example, if an existing (default) rule for a device includes: 1) Chown root Device, 2) Chgrp disk Device, and 3) Chmod u+wr,g+r Device, a process-specific rule (e.g., vm1_write_rule) for process 1 for the device can include: 1) Chgrp kvm Device. 2) Chown vm_WRITE Device, and 3) Chmod u+w,g+r Device, a process-specific rule (e.g., vm2_read_rule) for process 2 for the device can include: 1) Chgrp kvm Device and 2) Chmod go+r Device, and a process-specific rule (e.g., vm3_read_rule) for process 3 for the device can include: 1) Chgrp kvm Device and 2) Chmod go+r Device.

In one embodiment, processing logic associates the virtual machine-specific rule for the device with the virtual machine by creating a name for the virtual machine-specific rule that includes an identifier of the virtual machine (e.g., name, number, etc.). For example, a request to add virtual machine A includes a requirement for virtual machine A to use a disk. An existing device rule for disks is obtained called "disk rule." In this example, a virtual machine-specific rule is created for virtual machine A for a disk and is named "virtual machine A disk rule." In another embodiment, processing logic associates the virtual machine-specific rule for the device with the virtual machine by changing the permissions of the virtual machine-specific rule to be owned by the virtual machine (e.g., only allow the virtual machine to access the virtual machine-specific rule). Using the previous example, the permissions for the virtual machine-specific rule for virtual machine A for the disk is updated to be readable and writable only by virtual machine A. The process of creating a rule for the device identified in the request can be repeated for each existing device rule associated with the device. For example, if a request identifies that a disk be used by the virtual machine, and a disk has a rule A and a rule B, a virtual machine-specific rule for the disk based on rule A will be created for the disk based on the virtual machine and a virtual machine-specific rule based on rule B will be created for the disk based on the virtual machine.

At block 320, processing logic determines if the request identifies an additional device by accessing the request and obtaining one or more existing device rules associated with the additional device that meet the requirement that identified the device. If the request identifies an additional device, the method 300 returns to block 315 to create one or more virtual machine-specific rules for the additional device. If the request does not identify an additional device, the method 300 proceeds to block 325.

At block 325, processing logic stores the virtual machine-specific rules for the virtual machine. In one embodiment, the virtual machine-specific rules can be stored in a data store. In one embodiment, processing logic provides the virtual machine-specific rules associated with a device to a device manager upon the creation of a new virtual machine-specific rule. For example, if a creation request for virtual machine A causes a virtual machine-specific rule for virtual machine A to be created for disk X, and virtual machine-specific rule for virtual machine B exists for disk X and a virtual machine-specific rule for virtual machine C exists for disk X, processing logic will provide the virtual machine-specific rules for virtual machine A, B, and C for disk X to the device manager to be applied.

In an alternate embodiment, by storing the virtual machine-specific rules, processing logic can cause the virtual machine-specific rules to be applied based on a system state by a device manager of the computing system (e.g., UDEV), a kernel running on the computing system, etc. In one embodiment, the system state includes the virtual devices currently associated with the computing system and system requirements for the virtual devices. For example, the system state can include the virtual machines currently running on the computing system, virtual disks currently available to the computing system, virtual memory available to the computing system, etc. Processing logic can obtain the system state from the computing system, such as from a subsystem of the computing system that manages the hardware devices. For example, processing logic can obtain the system state from a device manager of the computing system (e.g., UDEV), a kernel running on the computing system, etc. In one embodiment, processing logic causes the virtual machine-specific rules to be applied based on the system state by determining the virtual devices currently associated with the computing system from the system state, determining the rules for the virtual devices currently associated with the computing system (e.g., virtual machine-specific rules, existing rules, both virtual machine-specific rules and existing rules, etc.), injecting one or more of the determined rules into a device manager (e.g., UDEV), and triggering the device manager to run using the one or more of the determined rules injected into the device manager.

For example, a disk on a computing system is owned by a root user of the computing system and has a rule "disk rule," and virtual machines A, B, and C are created on the computing system. Each virtual machine will create a virtual machine-specific rule based on "disk rule," such that "virtual machine A disk rule," "virtual machine B disk rule," and "virtual machine C disk rule" are created. To cause the rules to be applied, processing logic obtains the system state and determines that virtual machine A, virtual machine B, and virtual machine C are running on the computing system based on the system state, determine that rules "virtual machine A disk rule," "virtual machine B disk rule," and "virtual machine C disk rule" are associated with virtual machine A, virtual machine B, and virtual machine C, injects the rules "virtual machine A disk rule," "virtual machine B disk rule," and "virtual machine C disk rule" into UDEV, and triggers UDEV to run using the determined rules.

Figure 4:
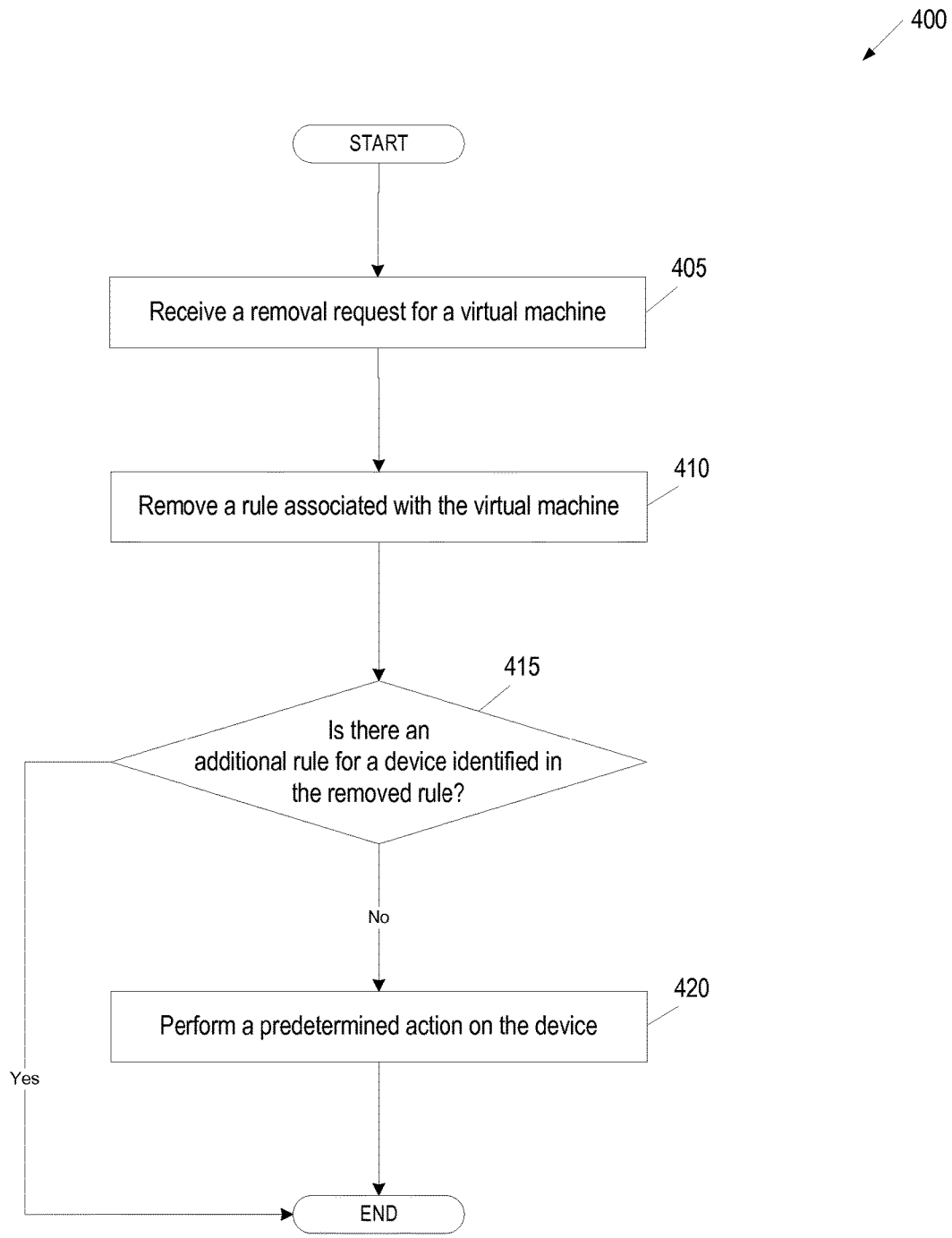
FIG. 4 is a flow diagram illustrating an embodiment for a method of removing a rule for a device, in accordance with an embodiment.

FIG. 4 is a flow diagram of an embodiment of a method 400 for removing a rule for a device. The method 400 is performed by processing logic that may comprise hardware (circuitry, dedicated logic, etc.), software (such as is run on a general purpose computer system or a dedicated machine), or a combination of both. In one embodiment, the method 400 is performed by the rule module 200 of FIG. 2.

At block 405, processing logic receives a removal request. In one embodiment, the removal request is received in response to a request to remove virtual hardware from a computing system using software, such as the removal or deletion of a virtual machine on a computing system, the removal or deletion of virtual memory on a computing system, etc. In an alternate embodiment, the removal request is received in response to a removal of physical hardware or software to a computing system, such as the removal of a disk of the computing system, the removal of a Universal Serial Bus (USB) connector into the computing system to disconnect the computing system and a hardware device, etc. The removal request can include an identifier for a virtual machine, such as a name of a virtual machine to remove or delete.

At block 410, processing logic removes a virtual machine-specific rule associated with the virtual machine. Processing logic can remove the virtual machine-specific rule associated with the virtual machine by identifying a virtual machine-specific rule associated with the virtual machine and deleting the identified virtual machine-specific rule. In one embodiment, processing logic identifies a virtual machine-specific rule associated with the virtual machine by searching a data store for virtual machine-specific rules that include an identifier of the virtual machine. The identifier of the virtual machine can include a name of the virtual machine, a numeric identifier of the virtual machine, an abbreviation associated with the virtual machine, etc. For example, a removal request is received for virtual machine A and there are virtual machine-specific rules named "virtual machine A disk rule" and "virtual machine B disk rule." In this example, "virtual machine A disk rule" will be identified as being associated with virtual machine A. In an alternate embodiment, processing logic identifies one or more virtual machine-specific rules associated with the virtual machine by identifying the virtual machine-specific rules that are owned by the virtual machine (e.g., using permissions). For example, a removal request is received for a virtual machine A and there are rules named "disk rule" with ownership permissions for virtual machine A and "disk rule" with ownership permissions for virtual machine B. In this example, "disk rule" with ownership permissions for virtual machine A will be identified as being associated with the virtual machine A. In some embodiments, processing logic repeats the identification and deletion of virtual machine-specific rules associated with the virtual machine until no additional virtual machine-specific rules associated with the virtual machine are found. Prior to deleting a virtual machine-specific rule, processing logic can store an identifier for a device associated with the virtual machine-specific rule. For example, if "disk rule A" was deleted, processing logic stores "disk" as the device associated with the virtual machine-specific rule.

At block 415, processing logic determines whether there is an additional rule for a device identified in the removed rule. For example, if the removed virtual machine-specific rule was "disk rule virtual machine A," and was based on "disk rule," the additional rule will also be based on "disk rule." In an alternate example, the additional rule is any rule that identifies the device identified in the removed rule and may not be based on the existing rule on which the removed virtual machine-specific rule was based. In one embodiment, processing logic determines whether there is an additional rule for a device identified in the removed virtual machine-specific rule by identifying the device and searching a rules data store. In one embodiment, processing logic identifies a device identified in the removed virtual machine-specific rule by accessing a data store and obtaining the identifier. In an alternate embodiment, processing logic identifies a device identified in the removed virtual machine-specific rule by accessing the removal request. In another alternate embodiment, processing logic identifies a device identified in the removed virtual machine-specific rule by identifying one or more devices associated with the virtual machine. In yet another embodiment, processing logic identifies a device identified in the removed virtual machine-specific rule by looking into the removed virtual machine-specific rule and matching the object of the removed virtual machine-specific rule. Processing logic can search a rules data store with a query including the identified device. If the query returns one or more rules for the identified device, processing logic can determine that there are additional rules for the device identified in the removed rule. If the query does not return any rules for the identified device, processing logic can determine that there are no additional rules for the device identified in the removed rule.

In an alternate embodiment, processing logic determines whether there is an additional rule for a device identified in the removed rule by determining whether the device is owned by an existing virtual machine. For example, the device is a disk owned by virtual machine A and virtual machine B. Virtual machine A and virtual machine B each have a copy of a disk rule for the disk, which, when applied, gave each virtual machine ownership of the disk. In this example, when virtual machine A is removed, virtual machine B will continue to own the disk.

In an alternate embodiment, processing logic determines whether there is an additional rule associated with the device by determining whether an additional rule associated with the device still exists. For example, a rule "virtual machine A disk rule" and "virtual machine B disk rule" exist, and "virtual machine A disk rule" was removed upon receiving a removal request for virtual machine A. In this example, there is an additional rule associated with the disk because "virtual machine B disk rule" exists.

In another alternate embodiment, processing logic determines whether there is an additional rule for a device identified in the removed rule by querying a rule database for an additional rule for the device (e.g., submitting a query including an identifier of the device to the rule database). In yet another alternate embodiment, processing logic determines whether there is an additional rule for a device identified in the removed rule by querying a device manager for an additional rule for the device (e.g., submitting a query or request to the device manager including an identifier of the device).

If there is an additional rule for a device identified in the removed rule, the method 400 ends. In one embodiment, if there is an additional rule for a device identified in the removed rule, processing logic applies the additional rule for the device prior to the method 400 ending. If there are is no additional rule for a device identified in the removed rule, the method 400 proceeds to block 420.

At block 420, processing logic performs a predetermined action on the device. The predetermined action can be based on no virtual machines (e.g., virtual devices) currently being associated with the device. The predetermined action can include restoring the device to a previous state, changing the permission of the device (e.g., to root user, to super user, etc.), restoring the device to an initial state, disconnecting the device, etc. For example, a disk on a computing system is owned by virtual machine A and virtual machine B. When virtual machine A and virtual machine B are removed, the ownership of the disk is updated to be the root user of the computing system.

Figure 5:
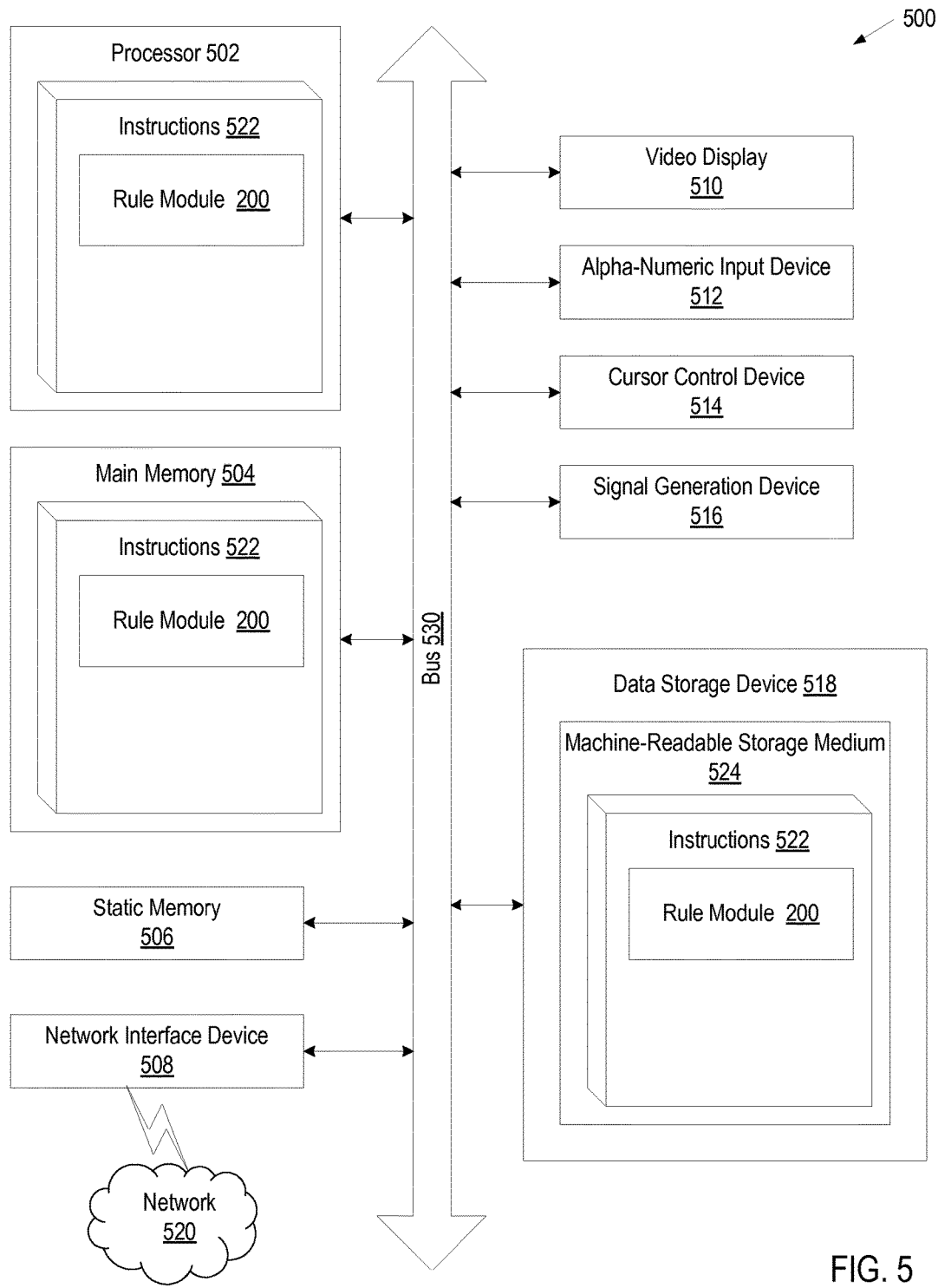
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a rule module 200, and/or a software library containing methods that create multiple rules for a device to allow concurrent access to the device by different processes. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating," "creating," "determining," "computing," "identifying," "modifying," "triggering," "injecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of a host computing system, a request to add a virtual machine (VM) of a plurality of virtual machines to a host computing system;
   searching, by the processing device, the request for a keyword identifying a device that is shared by the plurality of virtual machines;
   creating, by the processing device, a first VM-specific rule for the device, wherein the first VM-specific rule allows, to the VM, concurrent access to the device with at least one other VM of the plurality of virtual machines;
   determining a system state from a device manager running on the host computing system, the system state identifying currently running virtual machines of the plurality of virtual machines;
   determining a plurality of VM-specific rules for the plurality of virtual machines in view of the system state, wherein the plurality of VM-specific rules exclude the first VM-specific rule;
   determining whether the first VM-specific rule affects permissions of the currently running virtual machines;
   determining whether the first VM-specific rule interferes with one of the plurality of VM-specific rules;
   responsive to determining that the first VM-specific rule does not affect permissions of the currently running virtual machines and does not interfere with one of the plurality of VM-specific rules, triggering, by the processing device, the device manager to run using the first VM-specific rule; and
   executing, by the VM, at least one task on the device that is shared by the plurality of virtual machines.

2. The method of claim 1, wherein the request to add the VM further identifies another device that is shared by the plurality of virtual machines and the method further comprising:
   creating a second VM-specific rule for the another device in view of the VM; and
   storing the second VM-specific rule for the another device in association with the VM.

3. The method of claim 2, wherein storing the second VM-specific rule comprises storing the second VM-specific rule in a data store.

4. The method of claim 1, further comprising:
   in response to receiving a removal request for the VM, removing the first VM-specific rule for the device;
   determining whether an additional rule is associated with the device; and
   upon determining that an additional rule is not associated with the device, performing a predetermined action on the device.

5. The method of claim 1, wherein creating the first VM-specific rule for the device further comprises at least one of changing a name of the first VM-specific rule to comprise an identifier of the VM or changing an ownership of the first VM-specific rule to be owned by the VM.

6. The method of claim 1, further comprising:
   receiving a request to add a second VM of the plurality of virtual machines to the host computing system, the request identifying the device that is shared by the plurality of virtual machines;
   generating, algebraically, a second VM-specific rule that is specific to the second VM for the device in view of an existing device rule for the device, wherein the second VM-specific rule does not interfere with the first VM-specific rule for the device; and
   associating the second VM-specific rule with the second VM.

7. The method of claim 1, further comprising:
   retrieving the first VM-specific rule from a data store; and
   using the first VM-specific rule to provide concurrent access to the device by the VM and the at least one other VM.

8. The method of claim 1, wherein the system state further identifies one of which of a plurality of virtual disks are currently available or an amount of virtual memory currently available.

9. A non-transitory computer readable storage medium having instructions that, when executed by a processing device, cause the processing device to:
   receive, by the processing device, a request to add a virtual machine (VM) of a plurality of virtual machines to a host computing system, the request identifying a device that is shared by the plurality of virtual machines;
   create, by the processing device, a first VI specific rule for the device, wherein the first VM-specific rule allows, to the VM, concurrent access to the device with at least one other VM of the plurality of virtual machines;
   determine a system state from a device manager running on the host computing system, the system state identifying which of the plurality of virtual machines are currently running on the host computing system;
   determine a plurality of VM-specific rules for the plurality of virtual machines in view of the system state, wherein the plurality of VM-specific rules exclude the first VM-specific rule;
   determine whether the first VM-specific rule affects permissions of the currently running virtual machines;
   determine whether the first VM-specific rule interferes with one of the plurality of VM-specific rules;
   responsive to determining that the first VM-specific rule does not affect permissions of the currently running virtual machines and does not interfere with one of the plurality of VM-specific rules, trigger, by the processing device, the device manager to run using the first VM-specific rule; and
   execute, by the VM, at least one task on the device that is shared by the plurality of virtual machines.

10. The non-transitory computer readable storage medium of claim 9, having instructions that, when executed by the processing device, further cause the processing device to:
   create a second VM-specific rule for another device in view of the VM, wherein the another device is identified in the request to add the VM, wherein the another device is shared by the plurality of virtual machines; and
   store the second VM-specific rule for the another device in association with the VM.

11. The non-transitory computer readable storage medium of claim 9, having instructions that, when executed by a processing device, further cause the processing device to:
   in response to receiving a removal request for the VM, remove the first VM-specific rule for the device;
   determine whether an additional rule is associated with the device; and
   upon determining that an additional rule is not associated with the device, perform a predetermined action on the device.

12. The non-transitory computer readable storage medium of claim 9, wherein to create the first VM-specific rule for the device further comprises to change a name of the first VM-specific rule to comprise an identifier of the VM or to change an ownership of the first VM-specific rule to be owned by the VM.

13. The non-transitory computer readable storage medium of claim 9, further comprising instructions that, when executed by the processing device, further cause the processing device to:
   receive a request to add a second VM of the plurality of virtual machines to the host computing system, the request identifying the device that is shared by the plurality of virtual machines;
   generate, algebraically, a second VM-specific rule that is specific to the second VM for the device in view of an existing device rule for the device, wherein the second VM-specific rule does not interfere with the first VM-specific rule for the device; and
   associate the second VM-specific rule with the second VM.

14. The non-transitory computer readable storage medium of claim 9, wherein the system state further identifies one of which of a plurality of virtual disks are currently available or an amount of virtual memory currently available.

15. A computing device comprising:
   a memory; and
   a processing device operatively coupled to the memory, wherein the processing device is to:
      receive a request to add a virtual machine (VM) of a plurality of virtual machines to a host computing system, the request identifying a device that is shared by the plurality of virtual machines;
      create a first VM-specific rule for the device wherein the first VM-specific rule allows, to the VM, concurrent access to the device with at least one other VM of the plurality of virtual machines;
      determine a system state from a device manager running on the host computing system, the system state identifying currently running virtual machines of the plurality of virtual machines;
      determine a plurality of VM-specific rules for the plurality of virtual machines in view of the system state, wherein the plurality of VM-specific rules exclude the first VM-specific rule;
      determine whether the first VM-specific rule affects permissions of the currently running virtual machines;
      determine whether the first VM-specific rule interferes with one of the plurality of VM-specific rules;
      responsive to determining that the first VM-specific rule does not affect permissions of the currently running virtual machines and does not interfere with one of the plurality of VM-specific rules, trigger the device manager to run using the first VM-specific rule; and
      execute, by the VM, at least one task on the device that is shared by the plurality of virtual machines.

16. The computing device of claim 15, wherein the request further identifies another device, and wherein the processing device is further to:
   create a second VM-specific rule for another device in view of the VM, wherein the another device is identified in the request to add the VM, wherein the another device is shared by the plurality of virtual machines; and
   store the second VM-specific rule for the another device in association with the VM.

17. The computing device of claim 16, wherein the processing device is further to:
   in response to receiving a removal request for the VM, remove the second VM-specific rule for the device;
   determine whether an additional rule is associated with the device; and
   upon determining that an additional rule is not associated with the device, perform a predetermined action on the device.

18. The computing device of claim 15, wherein to create the first VM-specific rule for the device further comprises to change a name of the first VM-specific rule to comprise an identifier of the VM or to change an ownership of the first VM-specific rule to be owned by the VM.

19. The computing device of claim 13, wherein the processing device is further to:
- receive a request to add another virtual machine of the plurality of virtual machines to the host computing system, the request identifying the device that is shared by the plurality of virtual machines;
- generate another rule that is specific to the another virtual machine for the device in view of an existing device rule for the device; and
- associate the another rule with the another VM.

20. The computing device of claim 15, wherein the system state further identifies one of which of a plurality of virtual disks are currently available or an amount of virtual memory currently available.

\* \* \* \* \*